(12) United States Patent
Blake et al.

(10) Patent No.: US 6,855,665 B1
(45) Date of Patent: Feb. 15, 2005

(54) COMPOSITIONS TO REMOVE RADIOACTIVE ISOTOPES AND HEAVY METALS FROM WASTEWATER

(76) Inventors: Alexander Blake, 4 Walnut Hollow La., Holmdel, NJ (US) 07733; Barbara Blake, 4 Walnut Hollow La., Holmdel, NJ (US) 07733

( * ) Notice: Subject to any disclaimer, the term of this patent is extended or adjusted under 35 U.S.C. 154(b) by 0 days.

(21) Appl. No.: 10/670,082

(22) Filed: Sep. 23, 2003

(51) Int. Cl.$^7$ ................................................ B01J 20/10
(52) U.S. Cl. ...................................... 502/410; 502/407
(58) Field of Search ................................ 502/401, 405, 502/407, 410, 414, 415

(56) References Cited

U.S. PATENT DOCUMENTS 4,166,039 A * 8/1979 Wise ........................... 510/453
4,765,908 A * 8/1988 Monick et al. ............. 210/666

* cited by examiner

Primary Examiner—Stanley S. Silverman
Assistant Examiner—Edward M. Johnson

(57) ABSTRACT

The present invention provides compositions and a method to remove a plurality of radioactive isotopes and/or heavy metals simultaneously from water or wastewater. The compositions comprise lattice clays; flocculants; a neutron absorbent; catalysts; and a setter. The selected compositions is entered into a vessel and agitated with the water to produce a sludge containing the contaminants.

1 Claim, No Drawings

COMPOSITIONS TO REMOVE RADIOACTIVE ISOTOPES AND HEAVY METALS FROM WASTEWATER

REFERENCES CITED

U.S. Patent Documents

U.S. Pat. No. 4,765,908 August 1988 Monick et al.

U.S. Pat. No. 5,880,060 March 1999 Blake, Blake and Lacy.

BACKGROUND OF THE INVENTION

The present invention is applicable to water and wastewater treatment and, in particular to the removal of a plurality of radioactive isotopes and/or heavy metals from water and wastewater, thereby producing a sludge containing the contaminants. A diverse number of industries generate wastewater containing radioactive material and/or heavy metals. The discharge of wastewater containing radioactive isotopes and/or heavy metals is strictly regulated by environmental laws. Wastewater containing heavy metals is generated by a variety of industries, such as metal finishing, electronics manufacturing, textile industry, automobile manufacturing, aircraft industry, mining and others. Wastewater containing radioactive isotopes are generated by nuclear facilities in the form of wash-downs, cooling water, fuel preparation, as well as the mining of ore, refining of ore, milling, hospitals and research facilities. Combinations of radioactive material and heavy metals are often present in run-off ponds, especially in mining areas.

The considerable volume of wastewater containing radioactive material and/or heavy metals is a worldwide problem, as is the lack of effective and economical treatment methods and, in particular, the removal of combinations of radioactive isotopes and heavy metals, either separately or in combination.

The present invention obviates these problems by providing an effective water and wastewater treatment method which is capable of removing a plurality of radioactive isotopes and heavy metals simultaneously from water and wastewater and adsorbing same onto a usually stable sludge, thereby reducing the contaminants to acceptable limits. The treated water can then be safely discharged or, in some cases, recycled. However, if the water or wastewater to be treated contains radioactive isotopes, by law, the resulting sludge has to be containerized. The treatment method of the present invention results in savings to industry and in the protection of natural resources and the environment in general.

SUMMARY OF THE INVENTION

The present invention provides compositions and a method for the removal of a plurality of radioactive isotopes and heavy metals from water and wastewater, either separately or in combination. The treatment compositions of the present invention comprise effective amounts of lattice clays, in particular naturally occurring montmorillonite, Indian red potters clay and calcium bentonite; a carrier/dispersing agent; one or more flocculants; a neutron absorbent which also functions as a chelating and completing agent; a setter; one or more catalysts; one or more polyelectrolytes; and a binder and sealer.

Specifically, the compositions of the present invention comprise 1 to 2% of magnesium silicate; 15 to 40% of naturally occurring montmorillonite; 11 to 30% of Indian red potters clay; 5 to 30% of a metal salt; 5 to 30% of calcium bentonite; 5 to 30% of calcium hydroxide; 2 to 5% of sodium carbonate; 1 to 5% of hafnium; 1 to 6% of one or more polyelectrolytes; 5 to 10% of calcium sulfate; and 1 to 5% of silica gel.

It is to be understood that the above percentages refer to each component's percentage of the total treatment compositions as are used to treat the water or wastewater. Also, it is to be understood that the above percentages are approximations, with deviations being permitted within the scope of the invention. It is also to be understood that a composition for a particular application may not include all of the listed components.

The compositions and method of the present invention are capable of removing a plurality of radioactive isotopes and/or a plurality of heavy metals simultaneously from water or wastewater. The method of this invention includes the introduction of one of the treatment compositions of the present invention and as determined in bench tests into the treatment vessel holding the water or wastewater containing one or more radioactive isotopes and/or one or more heavy metals. In addition, the water or wastewater may also contain other contaminants such as oil, latex, phosphorus etc. The water or wastewater, with the predetermined treatment composition added, is agitated for a predetermined length of time, which is usually 4 minutes. However, in some cases the agitation phase may be slightly shorter or longer. Upon completion of the agitation phase, the floc with the adsorbed contaminants is allowed to settle in the same vessel. Upon completion of the settling phase, the supernatant is discharged. Upon completion of the supernatant discharge, the sludge containing the contaminants is discharged, with the use of a pump, to a filtration and dewatering device. The supernatant and filtrate can usually be discharged into publicly owned treatment works, natural bodies of water or, in some cases, recycled.

One of the actions involved in the treatment process is ion exchange, which is the exchange or transfer of an ion or charged particle held by a negative charge near a mineral surface with one that is present in a solution in contact with the material. This process is reversible, whereby cations and anions are interchangeable between mineral surfaces and solutions. Exchanges that can occur in any particular electrolyte and with a specific mineral are controlled by physiochemical laws.

The property of ion exchange results from a charge deficiency within the lattice of the clays. Usually steric relationships preclude the penetration of the crystal lattice by counterions, resulting in the exchange deficiency being effectively diffused over the surface of the particle. The charge deficiency is therefore satisfied by the formation of a electric double layer at the interface between the crystal lattice and the solution.

The process of ion exchange may occur between the ions on two mineral surfaces in contact and between the mineral surface and root hairs and is an important process in plant nutrition. Cation exchange capacity is defined as the amount of exchangeable cations, expressed as milliequivalents per gram or per 100 grams of material (clay, soil or mineral) determined experimentally at pH 7.

The determination of the total exchange capacity of a clay or other mineral is more simple and rapid than determination of the common exchangeable cations, i.e. $Ca^{++}$, $Mg^{++}$, $Na^+$, $K^+$, or $H^+$. Important to an understanding of ion exchange phenomena is the fact that the silicate structure which make up clay minerals, are determined by the ratio of the positive to the negative ions.

Shale and soil materials, when moist, are usually charged electro-negatively (zeta potential.) The ion exchange capacity in clays is due to: (1) broken bonds at the edges of silica-alumina sheets, (2) substitution within the lattice structure of a trivalent or quadrivalent ion resulting in unbalanced charges within the caly unit, and replacement of the hydrogen of exposed hydroxyl groups by a cation.

The system utilized in the present invention requires a vessel in which reaction and settling occur. It is equipped with a high speed agitator to assure fine distribution of the chemical composition and a sludge filtering and dewatering device. In the case of large or large continuous flows, a modular design with more than one vessel, but operating alternately, may be used.

DETAILED DESCRIPTION OF THE PREFERRED EMBODIMENTS

The treatment compositions of the present invention are able to remove a plurality of radioactive isotopes and/or heavy metals from a variety of waters and wastewaters that emanate from diverse sources. Depending on the particular contaminants in the water, the compositions may be altered to remove specific contaminants. As used herein, contaminants include aluminium, arsenic, barium, cadmium, chromium, cesium, cobalt, copper, iodine, iron, lead, mercury, molybdenum, nickel, rhodium, selenium, silver, strontium, vanadium and zinc. The compositions of the present invention may be able to remove other contaminants as well.

For an efficient removal of the contaminants from water, the compositions of the present invention comprise effective amounts of lattice clays such as and most preferably naturally occurring montmorillonite; Indian re potters clay; calcium bentonite; a carrier/dispersing agent; one or more flocculants; a neutron absorbent which also functions as chelating and complexing agent; a setter; one or more catalysts; one or more polyelectrolytes; and a binder and sealer. The montmorillonite, Indian red potters clay and calcium bentonite are the primary adsorbents in the compositions of the present invention. The montmorillonite and the Indian potters clay are used for their excellent coagulation and base exchange properties and, due to their large surface area, which is charged, perform as excellent adsorbents of radioactive isotopes and heavy metals. The calcium bentonite, besides being able to adsorb metals, is also an excellent adsorbent of oil, latex, phosphorus and other contaminants. The carrier/dispersing agent is magnesium silicate. The flocculants are a metal salt and calcium hydroxide. The preferable metal salt is aluminium sulfate. The preferred neutron absorbent is hafnium because of it's high neutron absorbing capacity and and which also functions as chelating and complexing agent. The calcium sulfate is a setter of the lattice clays and also functions as a weighting aid. The sodium carbonate is a catalyst for the montmorillonite, Indian red potters clay and calcium bentonite. One or more polyelectrolytes are catalysts and may be nonionic, cationic or anionic, or a combination of nonionic and cationic or anionic, depending on the application. Silica gel is the preferred binder and sealer in the composition of the present invention since it adsorbs moisture and accumulates finely divided solids.

The preferred treatment compositions comprise:
(a) About 1 to 2% of magnesium silicate
(b) About 15 to 40% of naturally occurring montmorillonite
(c) About 11 to 30% of Indian red potters clay
(d) About 5 to 30% of calcium bentonite
(e) About 5 to 30% of a metal salt
(f) About 5 to 30% of calcium hydroxide
(g) About 2 to 5% of sodium carbonate
(h) About 1 to 5% of hafnium
(i) About 1 to 61 of one or more polyelectrolytes
(j) About 5 to 10% of calcium sulfate
(k) About 1 to 5% of silica gel If the montmorillonite is 30% by weight of a composition of the present invention, the other components are selected to total 70%.

The components of the treatment compositions of the present invention are standard to fine mesh. Preferably, the combined weight of the montmorillonite, Indian red potters clay and calcium bentonite in the compositions of the present invention is 50% of the total weight of the compositions.

Not being bound by theory, it is believed that the montmorillonite, Indian red potters clay and calcium bentonite are the primary adsorbents. The Indian red potters clay and montmorillonite are excellent coagulants and adsorbents because of their strong base exchange properties and large, charged surface area.

The calcium bentonite is capable of adsorbing metals, but is also an excellent adsorbent of oil, latex, phosphorus and other contaminants.

The carrier/dispersing agent in the present invention is magnesium silicate.

The preferred flocculants are a metal salt, preferably aluminium sulfate, and calcium hydroxide.

The catalysts are sodium carbonate and one or more polyelectrolytes. The sodium carbonate functions as catalyst for the montmorillonite, Indian potters clay and calcium bentonite and aids in the precipitation. The polyelectrolytes may be nonionic, cationic or anionic or a combination of nonionic and cationic or anionic, depending on the application.

The neutron absorbent is hafnium because of it's high neutron absorbing capacity.

The calcium sulfate is a setter for the lattice clays, and therefore the sludge, and is also a weighting aid.

The binder and sealer in the compositions of the present invention is silica gel.

It is to be understood that the above percentages refer to each component's percentage of the total water treatment compositions as used to remove the contaminants. It is also to be understood that the above indicated percentages are approximations, with deviations being permitted within the scope of the invention. It is further to be understood that compositions for particular applications may not include all of the listed components.

The compositions of the present invention are prepared by adding the components proportionately together and blending same homogenously. The lesser components may be blended separately and then added to the other components as one.

The treatment composition selected is entered into a baffled or other type of vessel containing the water or wastewater and is agitated for a predetermined length of time. It is important to avoid a vortex during the agitation phase, which is the reason for baffling the vessel. The amount, by weight, of treatment composition to be added to the water depends upon the concentrations and types of contaminants in the water, and is determined in prior bench testing. Upon completion of the agitation phase, the floc with the adsorbed contaminants is allowed to settle in the same vessel. When the settling phase is completed, the supernatant is discharged to either a public owned treatment works (POTW) or is discharged into a natural body of water or into the ground. Upon completion of the supernatant discharge, the settled sludge with some remaining water is pumped to a filtration and dewatering device.

The following examples further illustrate the process and the compositions of the present invention. The examples are examplary and do not limit the scope of the invention. The invention utilizes a combination of chemical and physical processes, namely, (1) Demulsification
(2) Ion exchange
(3) Neutron absorption
(4) Adsorption
(5) Flocculation
(6) Coagulation
(7) Binding and sealing

EXAMPLE NO. 1

A treatment composition, having the components listed in Table No. 1 was prepared according to the present invention.

TABLE NO. 1

| Component | Percent by weight |
| --- | --- |
| Magnesium silicate | 1.59 |
| Montmorillonite | 27.78 |
| Aluminium sulfate | 15.87 |
| Polyelectrolyte-cationic | 2.38 |
| Polyelectrolyte-nonionic | 0.80 |
| Sodium carbonate | 3.17 |
| Calcium hydroxide | 19.84 |
| Calcium sulfate | 3.97 |
| Indian red potters clay | 6.35 |
| Calcium bentonite | 15.87 |
| Silica gel | 2.38 |

The prepared composition indicated in Table No. 1 was entered into a wastewater having the contaminants listed in Table No. 2 at a dose of 2 g/l.

TABLE NO. 2

| Parameter | Concentration |
| --- | --- |
| Ni (nickel) | 20.80 mg/l |
| Cu (copper) | 14.40 mg/l |
| Cr (chromium) | 15.40 mg/l |
| Zn (zinc) | 64.00 mg/l |
| Fe (iron) | 58.60 mg/l |

Upon treatment with the composition listed in Table No. 1, the concentrations were as listed in Table No. 3.

TABLE NO. 3

| Parameter | Concentration |
| --- | --- |
| Ni (nickel) | 0.11 mg/l |
| Cu (copper) | 0.97 mg/l |
| Cr (chromium) | 0.02 mg/l |
| Zn (zinc) | 0.18 mg/l |
| Fe (iron) | 0.90 mg/l |

EXAMPLE NO. 2

A treatment composition, having the components listed in Table No. 4 was prepared according to the present invention.

TABLE NO. 4

| Component | Percent by weight |
| --- | --- |
| Magnesium silicate | 1.61 |
| Montmorillonite | 28.22 |
| Aluminium sulfate | 14.52 |
| Polyelectrolyte-cationic | 3.23 |
| Sodium carbonate | 3.23 |
| Calcium hydroxide | 17.74 |
| Calcium sulfate | 4.03 |
| Indian red potters clay | 14.52 |
| Calcium bentonite | 7.26 |
| Hafnium | 4.03 |
| Silica gel | 1.61 |

The composition of Table No. 4 was entered into a wastewater having the contaminants listed in Table No. 5 at a dose of 2 g/l.

TABLE NO. 5

| Parameter | Concentration |
| --- | --- |
| Cesium | 100.00 mg/l |
| Cobalt-60 | 100.00 mg/l |
| Iodine-131 | 100.00 mg/l |
| Strontium-85 | 100.00 mg/l |

Upon treatment with the composition listed in Table No. 4, the concentrations were as indicated in Table No. 6.

TABLE NO. 6

| Parameter | Concentration |
| --- | --- |
| Cesium | 4.35 mg/l |
| Cobalt-60 | 0.29 mg/l |
| Iodine-131 | 3.80 mg/l |
| Strontium-85 | 6.20 mg/l |

EXAMPLE NO. 3

The prepared composition listed in Table No. 1 was entered into a wastewater having the contaminants listed in Table No. 7 at a dose of 2 g/l.

TABLE NO. 7

| Parameter | Concentration |
| --- | --- |
| Cobalt | 3.98 mg/l |
| Zn (zinc) | 33.20 mg/l |
| Ni (nickel) | 20.80 mg/l |
| Cu (copper) | 118.00 mg/l |
| Mg (magnesium) | 266.00 mg/l |
| Mn (manganese) | 44.50 mg/l |
| Fe (iron) | 16.00 mg/l |
| Strontium | 1.73 mg/l |

Upon treatment with the composition listed in Table No. 1, the concentrations were as indicated in Table No. 8.

TABLE NO. 8

| Parameter | Concentration |
| --- | --- |
| Cobalt | 0.23 mg/l |
| Zn (zinc) | 0.05 mg/l |
| Ni (nickel) | 0.08 mg/l |
| Cu (copper) | 0.50 mg/l |

TABLE NO. 8-continued

| Parameter | Concentration |
| --- | --- |
| Mg (magnesium) | 0.50 mg/l |
| Mn (manganese) | 0.05 mg/l |
| Fe (iron) | 0.50 mg/l |
| Strontium | 0.05 mg/l |

What is claimed is:

1. Treatment compositions to remove a plurality of radioactive isotopes and/or heavy metals from water and wastewater comprising:

(a) 1 to 2% by weight of magnesium silicate
(b) 15 to 40% of naturally occurring montmorillonite
(c) 11 to 30% of Indian red potters clay
(d) 5 to 30% of calcium bentonite
(e) 5 to 30% of a metal salt
(f) 5 to 30% of calcium hydroxide
(g) 2 to 5% of sodium carbonate
(h) 1 to 5% of hafnium
(i) 1 to 6% of one or more polyelectrolytes
(j) 5 to 10% of calcium sulfate
(k) 1 to 5% of silica gel.

* * * * *